United States Patent
Choi et al.

(10) Patent No.: US 9,491,709 B2
(45) Date of Patent: Nov. 8, 2016

(54) APPARATUS AND METHOD FOR TRIGGERING A MAXIMUM POWER REPORTING EVENT IN A WIRELESS COMMUNICATION NETWORK

(71) Applicant: QUALCOMM Incorporated, San Diego, CA (US)

(72) Inventors: Zae Yong Choi, San Jose, CA (US); Yi Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 14/310,900

(22) Filed: Jun. 20, 2014

(65) Prior Publication Data
US 2015/0189600 A1     Jul. 2, 2015

Related U.S. Application Data

(60) Provisional application No. 61/921,270, filed on Dec. 27, 2013.

(51) Int. Cl.
*H04B 7/00* (2006.01)
*H04W 52/14* (2009.01)
*H04W 52/36* (2009.01)
(Continued)

(52) U.S. Cl.
CPC ......... *H04W 52/146* (2013.01); *H04W 52/365* (2013.01); *H04W 52/367* (2013.01); *H04B 17/10* (2015.01); *H04W 52/225* (2013.01); *H04W 52/346* (2013.01); *Y02B 60/50* (2013.01)

(58) Field of Classification Search
CPC . H04W 24/08; H04W 52/02; H04W 52/146; H04W 52/365; H04W 52/367; H04W 52/346
USPC ........... 455/522, 69, 127.1, 127.5, 449, 571, 455/574; 370/310, 311, 328, 329, 338, 252
See application file for complete search history.

(56) References Cited

U.S. PATENT DOCUMENTS

| | | | |
|---|---|---|---|
| 2011/0159914 A1* | 6/2011 | Chen | H04W 52/362 455/522 |
| 2011/0310781 A1 | 12/2011 | Kim et al. | |

(Continued)

FOREIGN PATENT DOCUMENTS

EP     2538733 A1     12/2012

OTHER PUBLICATIONS

Ericsson et al., "Maximum Power Reduction (MPR) and Event 6D Reporting", 3GPP Draft, R2-097274, 3rd Generation Partnership Project (3GPP), Mobile Competence Centre, 650, Route Des Lucioles, F-06921 Sophia-Antipolis Cedex, France, No. Jeju, Nov. 9, 2009, XP050391482, [retrieved on Nov. 13, 2009], the whole document.

(Continued)

*Primary Examiner* — Shaima Q Aminzay
(74) *Attorney, Agent, or Firm* — Loza & Loza LLP

(57) ABSTRACT

Aspects of the present disclosure provide an apparatus and method of utilizing a filtered transmit power margin calculation, rather than an instantaneous Tx power, to determine whether or not to trigger an Event 6D report. The filtered transmit power margin may take into account not only the user equipment's transmit power and the maximum transmit power level, but in addition, a received maximum power reduction value.

24 Claims, 13 Drawing Sheets

(51) Int. Cl.
  *H04W 52/22* (2009.01)
  *H04W 52/34* (2009.01)
  *H04B 17/10* (2015.01)

(56) References Cited

U.S. PATENT DOCUMENTS

| | | |
|---|---|---|
| 2012/0039294 A1 | 2/2012 | Yan et al. |
| 2012/0224552 A1 | 9/2012 | Feuersanger et al. |
| 2012/0244869 A1* | 9/2012 | Song ................. H04W 52/0206 455/449 |
| 2013/0155984 A1 | 6/2013 | Marinier et al. |
| 2013/0188563 A1* | 7/2013 | Kim .................... H04W 52/365 370/328 |

OTHER PUBLICATIONS

Interdigital: "Impact of P-MPR on HSPA", 3GPP Draft, R4-120543, 3rd Generation Partnership Project (3GPP), Mobile Competence Centre, 650, Route Des Lucioles, F06921 Sophia-Antipolis Cedex, France, vol. RAN WG4, No. Dresden, Germany, 20120206-20120210, Jan. 30, 2012, XP050568366, [retrieved on Jan. 30, 2012], the whole document.

International Search Report and Written Opinion—PCT/US2014/071861—ISA/EPO—Mar. 11, 2015.

Ericsson: "Maximum Power Reduction (MPR) and Event 6D Reporting," R2-096607, 3GPP TSG-RAN WG2 Meeting #68, Jeju, South Korea, Version 6.23.0, Release 6, Nov. 2009, pp. 3.

* cited by examiner

APPARATUS AND METHOD FOR TRIGGERING A MAXIMUM POWER REPORTING EVENT IN A WIRELESS COMMUNICATION NETWORK

CROSS-REFERENCE TO RELATED APPLICATIONS

This application claims priority to and the benefit of U.S. provisional patent application No. 61/921,270 filed in the United States Patent and Trademark Office on 27 Dec. 2013, the entire content of which is incorporated herein by reference.

TECHNICAL FIELD

Aspects of the present disclosure relate generally to wireless communication systems, and more particularly, to measurement event reporting in wireless communication networks.

BACKGROUND

Wireless communication networks are widely deployed to provide various communication services such as telephony, video, data, messaging, broadcasts, and so on. These networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In a UMTS network, the UTRAN may control a user equipment (UE) to perform different measurements and report the results back to the UTRAN. One type of these measurements is UE internal measurements such as UE transmission power and UE received signal level measurements. For example, the UE can monitor its transmission (Tx) power and trigger an Event 6D report when its Tx power reaches a maximum value. More detail on the Event 6D report can be found in a document 3GPP TS 12.533 section 14.6.2.4 version 11.9.0 (Release 11), the entire content of which is incorporated herein by reference. The Event 6D report allows the network to recognize which UEs are operating at their maximum Tx power such that the network may plan the uplink (UL) traffic of the UEs in a more efficient manner.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide an apparatus and method of utilizing a filtered transmit power margin calculation, rather than an instantaneous Tx power, to determine whether to trigger an Event 6D report. Here, the filtered transmit power margin may take into account not only the UE's transmit power and the maximum transmit power level, but in addition, a received maximum power reduction value. In some examples, the transmit power margin may be zeroed out in certain circumstances, even though a true instantaneous power headroom value may be nonzero, thus enabling Event 6D triggering to occur when it might rarely if ever occur otherwise, especially in the presence of intermittent high-speed dedicated physical control channel (HS-DPCCH) transmissions.

One aspect of the disclosure provides a method of wireless communication operable at a user equipment (UE) in a wireless communication network. The UE transmits a plurality of uplink transmissions having a transmit power. The UE further calculates a transmit power margin as a function of the transmit power, a maximum transmit power level (MTPL), and a maximum power reduction (MPR). In addition, the UE triggers, in response to a determination that the transmit power margin is equal to or less than a threshold level for at least a predetermined threshold amount of time, a transmission of a measurement report indicating that the transmit power of the UE has reached the MTPL.

Another aspect of the disclosure provides a user equipment (UE) for wireless communication. The UE includes means for transmitting a plurality of uplink transmissions having a transmit power. The UE further includes means for calculating a transmit power margin as a function of the transmit power, a maximum transmit power level (MTPL), and a maximum power reduction (MPR). In addition, the UE includes means for triggering, in response to a determination that the transmit power margin is equal to or less than a threshold level for at least a predetermined threshold amount of time, a transmission of a measurement report indicating that the transmit power of the UE has reached the MTPL.

Another aspect of the disclosure provides a computer-readable medium including code for causing a user equipment (UE) to transmit a plurality of uplink transmissions having a transmit power. The code further causes the UE to calculate a transmit power margin as a function of the transmit power, a maximum transmit power level (MTPL), and a maximum power reduction (MPR). In addition, the code causes the UE to trigger, in response to a determination that the transmit power margin is equal to or less than a threshold level for at least a predetermined threshold amount of time, a transmission of a measurement report indicating that the transmit power of the UE has reached the MTPL.

Another aspect of the disclosure provides a user equipment (UE) for wireless communication. The UE includes at least one processor, a memory, and a user interface operatively coupled to the at least one processor. The at least one processor includes first, second, and third components. The first component is configured to transmit a plurality of uplink transmissions having a transmit power. The second component is configured to calculate a transmit power margin as a function of the transmit power, a maximum transmit power level (MTPL), and a maximum power reduction (MPR). The a third component is configured to trigger, in response to a determination that the transmit power margin is equal to or less than a threshold level for at least a predetermined threshold amount of time, a transmission of a measurement report indicating that the transmit power of the UE has reached the MTPL.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure can improve the triggering mechanism of user equipment (UE) measurement reports. Some aspects of the disclosure, for example, improve the triggering mechanism of an Event 6D report when maximum power reduction (MPR) is utilized. Some aspects of the disclosure also improve the triggering mechanism of an Event 6D report when HSPA is implemented. Hereafter, non-limiting examples of the inventive concepts of the present disclosure will be described. However, one skilled in the art will appreciate that these examples may be modified in various different ways without departing from the spirit and scope of the disclosure.

Figure 1:
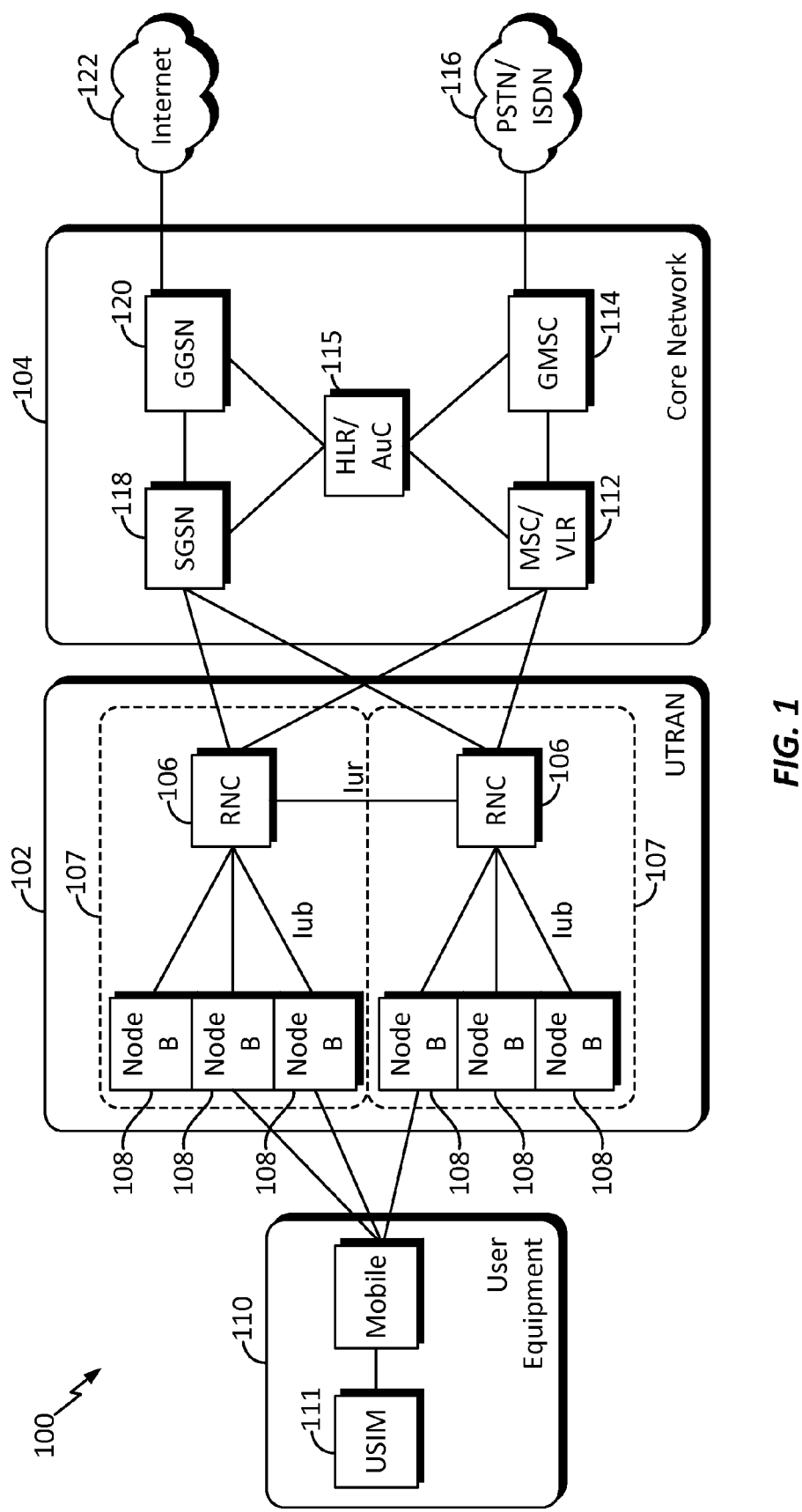
FIG. 1 is a block diagram conceptually illustrating an example of a telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a UE 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a tablet computer, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

Figure 2:
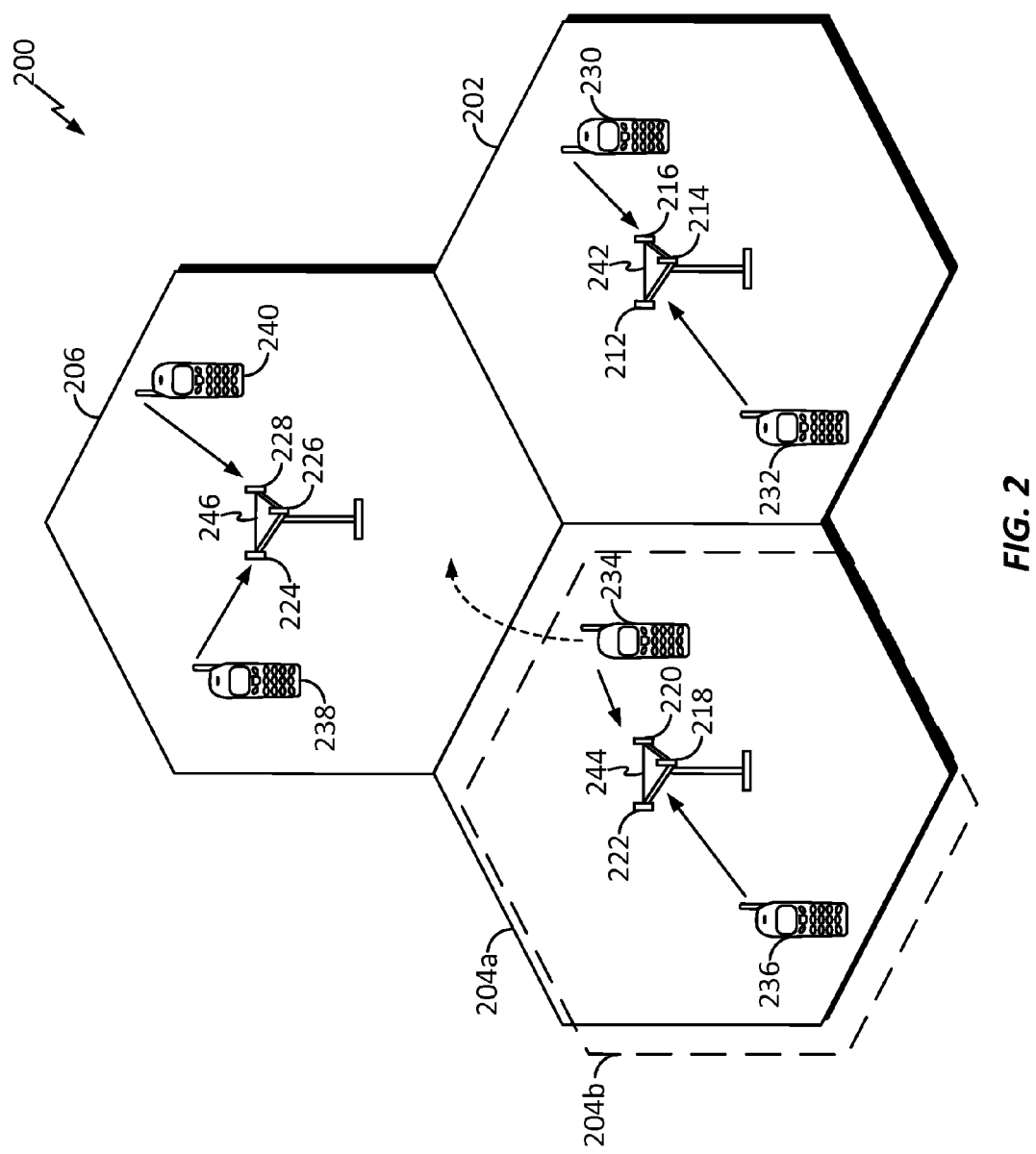
FIG. 2 is a conceptual diagram illustrating an example of an access network.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. For example, the RAN 200 may be the UTRAN 102. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206.

During a call with a source cell, or at any other time, a UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 110 and the UTRAN 102, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several Ues and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 110 has one serving cell: the strongest cell in the active set as according to the UE measurements of $E_c/I_0$. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
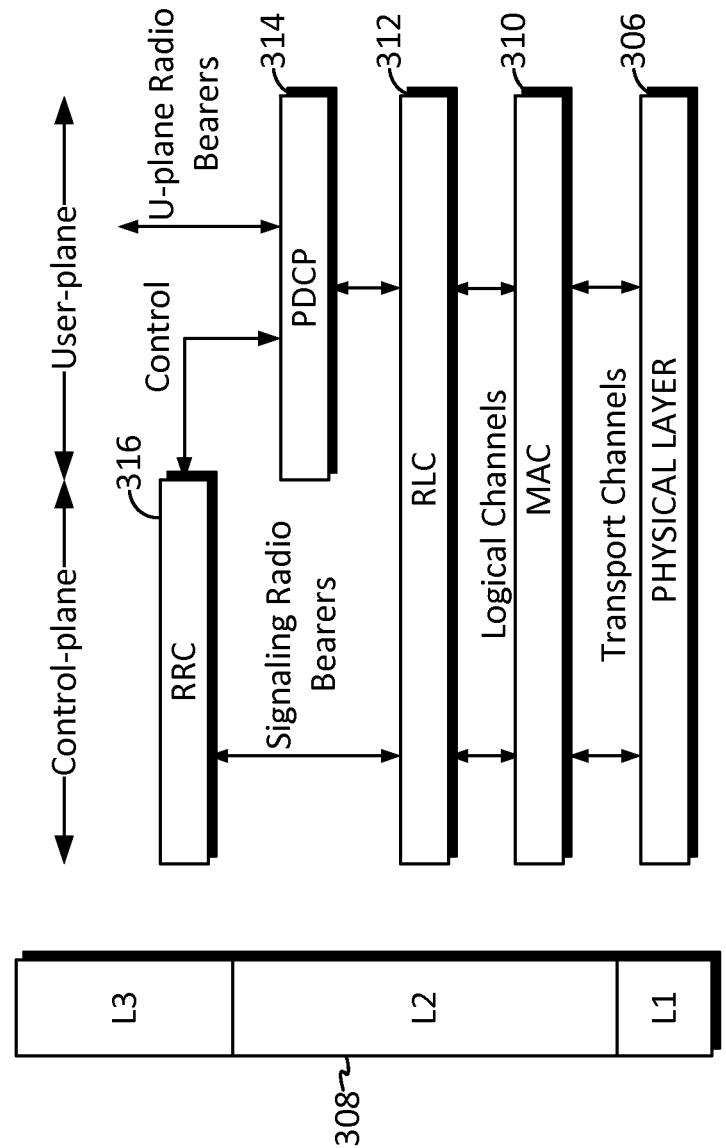
FIG. 3 is a conceptual diagram illustrating an example of a radio protocol architecture for the user and control plane.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 110 and Node B 108 over the physical layer 306.

At Layer 3, the RRC layer 316 handles the control plane signaling between the UE 110 and the Node B 108. RRC layer 316 includes a number of functional entities for routing higher layer messages, handling broadcasting and paging functions, establishing and configuring radio bearers, etc.

As indicated above, the RRC protocol, as defined in the document 3GPP TS 25.331, provides for a number of reporting events (sometimes referred to as mobility events or handover events) that may be sent between the UE 110 and the RNC 106. In general, the UE 110 monitors various parameters of the wireless channel, or the communication link, and can generate transmissions for reporting certain events to the network (e.g., Node B 108 or RNC 106). For example, the UE 110 can monitors various UE internal measurement qualities. (See, e.g., 3GPP TS 12.533 Section 14.6.1) As one particular example, the UE 110 monitors its own Tx power, or a filtered version of its Tx power (filtered Tx power), over a certain time duration or measurement window. Here, if the monitored Tx power or filtered Tx power has consistently or constantly reached a maximum Tx power level (MTPL) for a threshold amount of time, the UE 110 may transmit a measurement report indicating Event 6D. For example, the MTPL may be set by the network (e.g., Node B), and the threshold amount of time may be indicated by an information element (IE) "time-to-trigger" from the network. The transmission of the Event 6D measurement report, and its processing at the network, enables the network to monitor which UEs are operating at their maximum power level, to provide for uplink traffic planning in a more efficient manner.

In FIG. 3, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for Ues between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the Ues. The MAC sublayer 310 is also responsible for HARQ operations.

Figure 4:
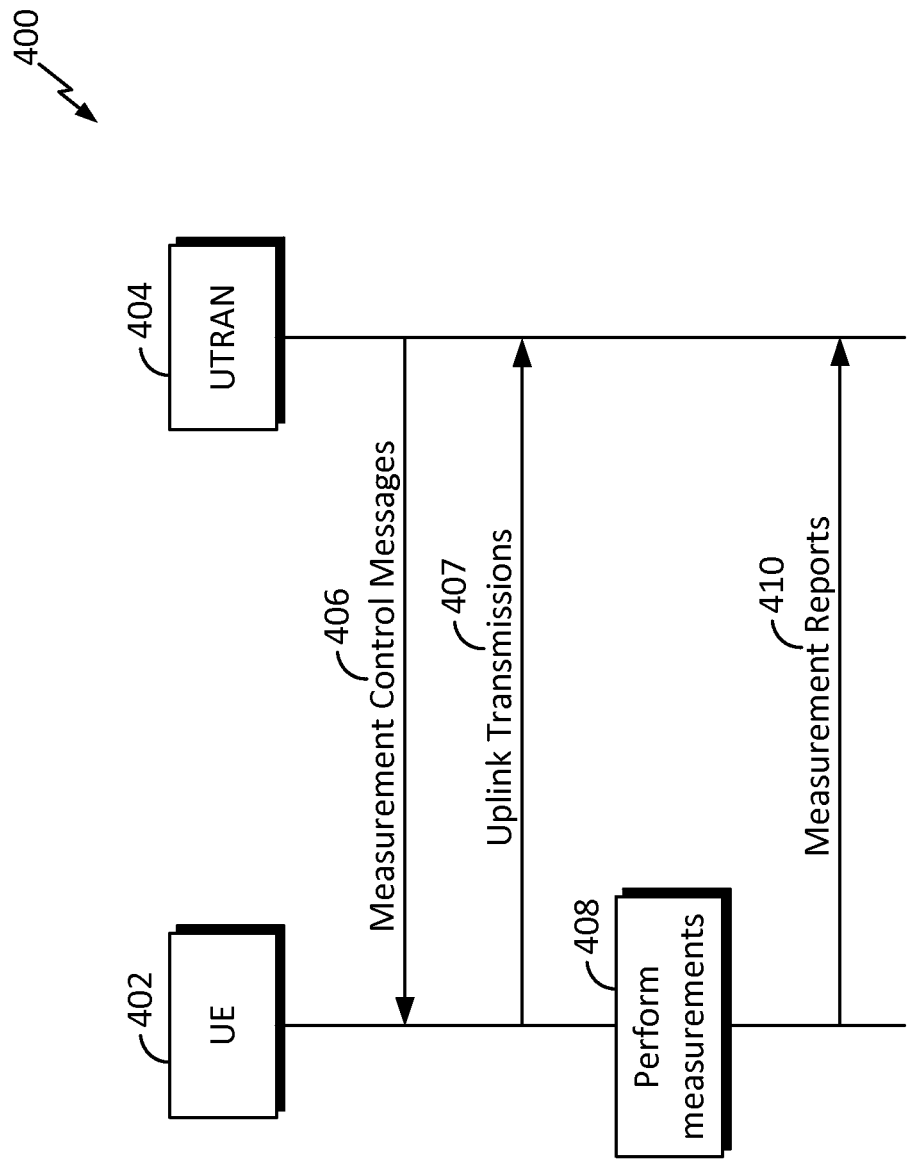
FIG. 4 is a message flow diagram conceptually illustrating a user equipment (UE) measurement reporting procedure between a UE and a UTRAN.

FIG. 4 is a message flow diagram illustrating a UE measurement reporting procedure 400 between a UE and a UTRAN. The procedure 400 may be performed by any one of the Ues illustrated in FIGS. 1, 2, 4, 5, 12, and/or 13. In one particular example, the procedure 400 may be performed by a UE 402 and a UTRAN 404. The UE 402 may be the same as the UE 110 of FIG. 1, and the UTRAN 404 may be the UTRAN 102 of FIG. 1. The UTRAN 404 may direct the UE 402 to perform various measurements by sending the UE 402 one or more measurement control messages 406. The UE 402 may transmit one or more uplink transmissions 407 to the UTRAN 404. For example, the uplink transmissions 407 may include user data and/or signaling data. The UE 402 performs the requested measurements 408 and sends one or more measurement reports 410 back to the UTRAN 404 if certain reporting criteria are met. For example, the UTRAN 404 may request the UE 402 to measure its Tx power, and the UE 402 will transmit an Event 6D report when the measured Tx power reaches the maximum value (e.g., MTPL) for a certain period of time duration.

Figure 5:
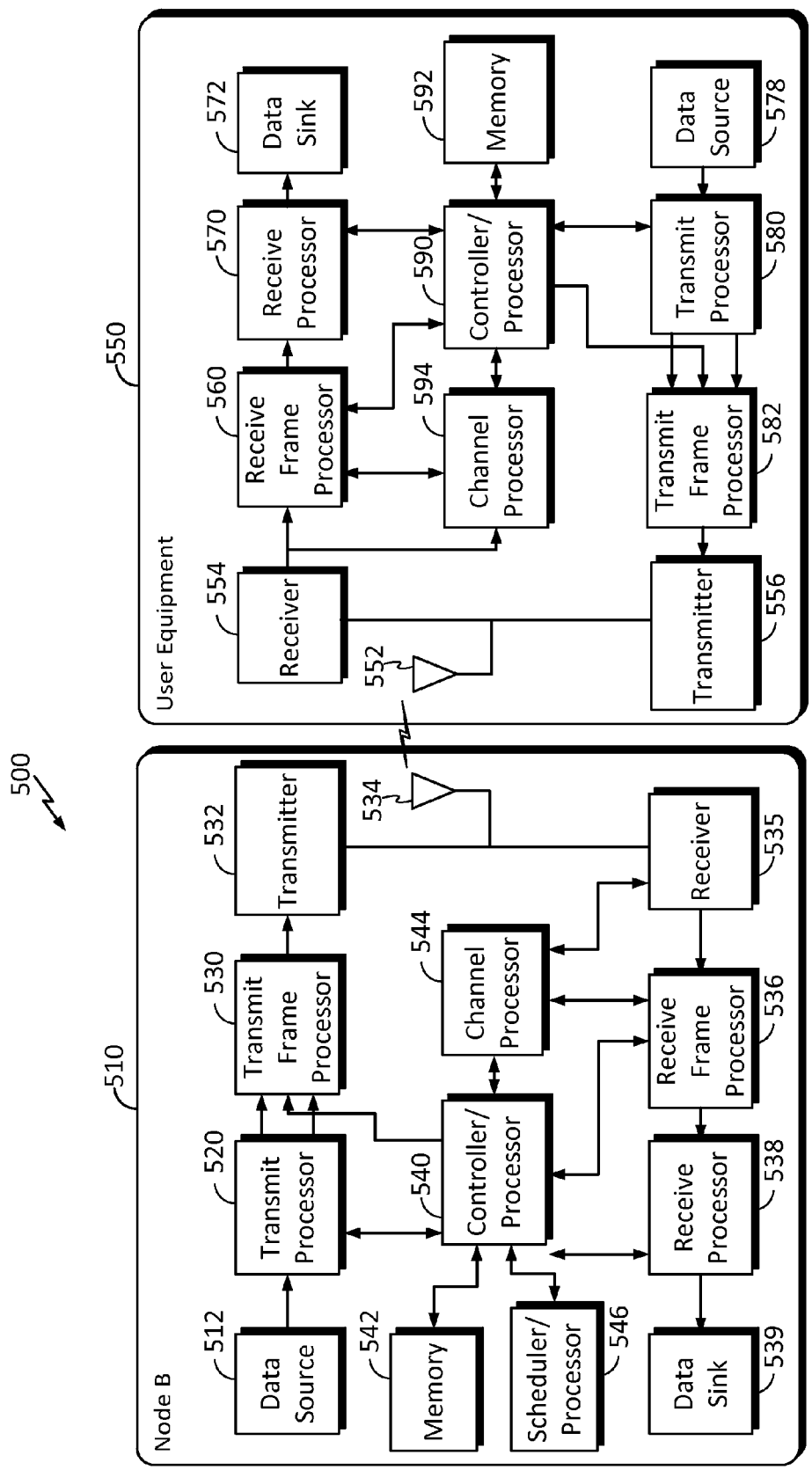
FIG. 5 is a block diagram conceptually illustrating an example of a Node B in communication with a UE in a telecommunications system.

FIG. 5 is a block diagram of an exemplary Node B 510 in communication with an exemplary UE 550, where the Node B 510 may be the Node B 108 in FIG. 1, and the UE 550 may be the UE 110 in FIG. 1. In one example, the Node B 510 and UE 550 may perform the UE measurement reporting procedure 400 of FIG. 4. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. For example, the downlink transmission may include one or more measurement control messages 406. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552. For example, the uplink transmission may include one or more measurement reports 410.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the Ues and schedule downlink and/or uplink transmissions for the Ues.

UMTS Release 99—Failure to Trigger Event 6D

As described above, the RRC entity at a UE (e.g., UE 400 or UE 550) may generate an Event 6D report when the UE's monitored Tx power reaches a maximum Tx power level (MTPL) for at least a threshold amount of time. For example, the threshold amount of time may be measured by running a timer with a value provided in an IE time-to-trigger from the network. The time-to-trigger refers to the period of time (e.g., in millisecond) between the timing of event detection (e.g., Tx power reaching MTPL) and the timing of triggering (sending) the measurement report. The network can utilize the Event 6D reports from UEs in its service area to help plan uplink traffic of those UEs in a more efficient manner. Without HSPA being deployed in a network, the conventional (e.g., UMTS Release 99 or known as "R99") Event 6D triggering mechanism works quite well. However, with the growing deployment of HSPA in UMTS networks, the transmission of certain HSPA channels such as HS-DPCCH and maximum power reduction (MPR) function can cause certain problems with the conventional method of Event 6D triggering. In other literature, the MPR may also be referred as power backoff, transmit power backoff, or output power backoff. The MPR refers to an amount, typically measured in decibel (dB), by which the UE reduces its maximum power in order to meet the requirements on maximum allowed out-of-band emissions.

Figure 6:
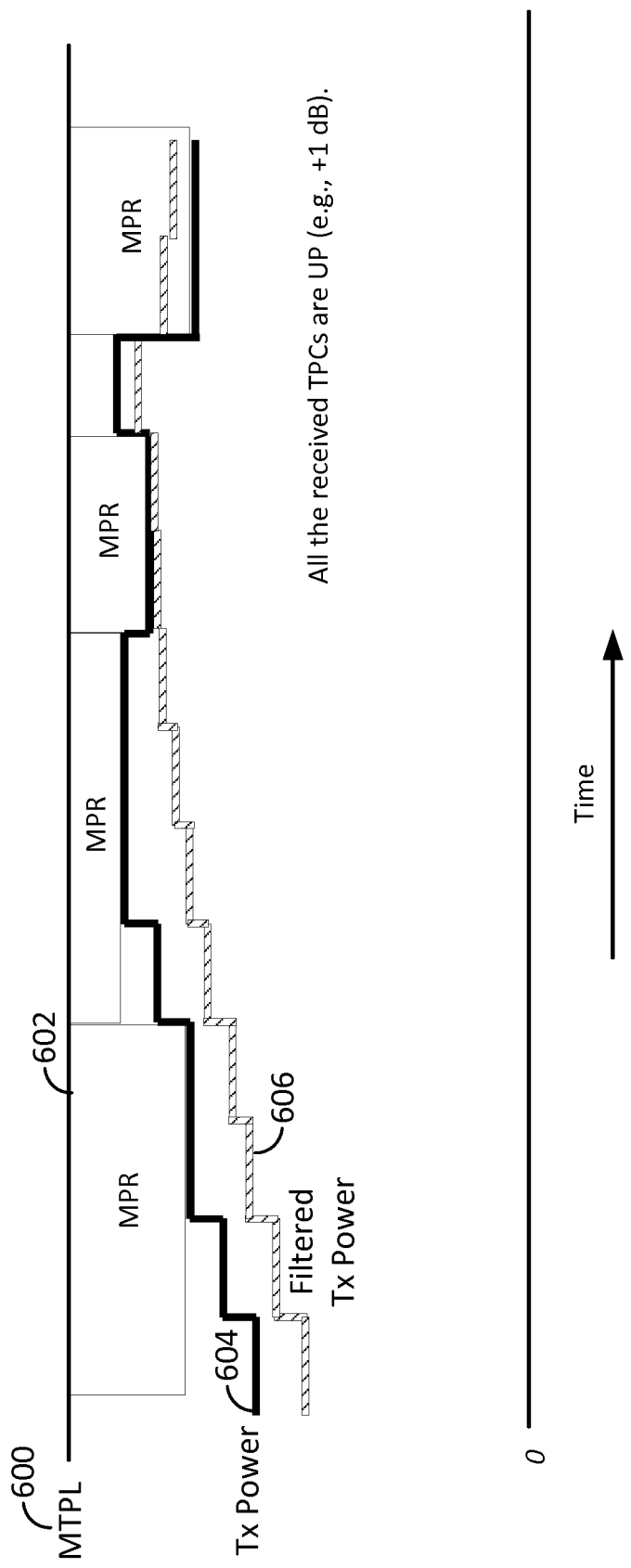
FIG. 6 is a simplified timing diagram illustrating an issue with conventional Event 6D triggering.

FIG. 6 is a simplified timing diagram illustrating an issue with conventional Event 6D triggering at a UE. As illustrated, the MTPL 600 may be configured at a constant value. The MPR 602 is a calculated value for reducing the maximum UE Tx power below the MTPL 600, which can assist a UE 550 to meet general requirements on signal quality and out-of-band emissions. The solid stepped line Tx power 604 illustrates the instantaneous uplink Tx power measured at the UE, and stepped line (with a hatched pattern) filtered Tx power 606 represents the value of the Tx power 604 as calculated when passed through a suitable low pass filter such as an infinite impulse response (IIR) filter. To illustrate a problematic scenario, it can be assumed that the UE receives one or more transmit power control (TPC) commands requesting the UE to increase (e.g., +1 dB) its Tx power during each slot.

Here, the effective maximum Tx power may be viewed as a function of time, with the introduction of the MPR in HSPA. As seen in this illustration, with the utilization of the MPR 602, Event 6D reporting is rarely if ever triggered because the Tx power 604 is capped at a level equal to the difference MTPL-MPR. In the illustrated example, the Tx power 604 is not maintained at the MTPL 600; nor is the filtered Tx power 606. Thus, as illustrated in FIG. 6, Event 6D reporting would not be triggered in this example. This problem will get even worse if the UE is ordered to use the filtered Tx power 606 for triggering Event 6D.

Use of Headroom to Help Trigger Event 6D

Figure 7:
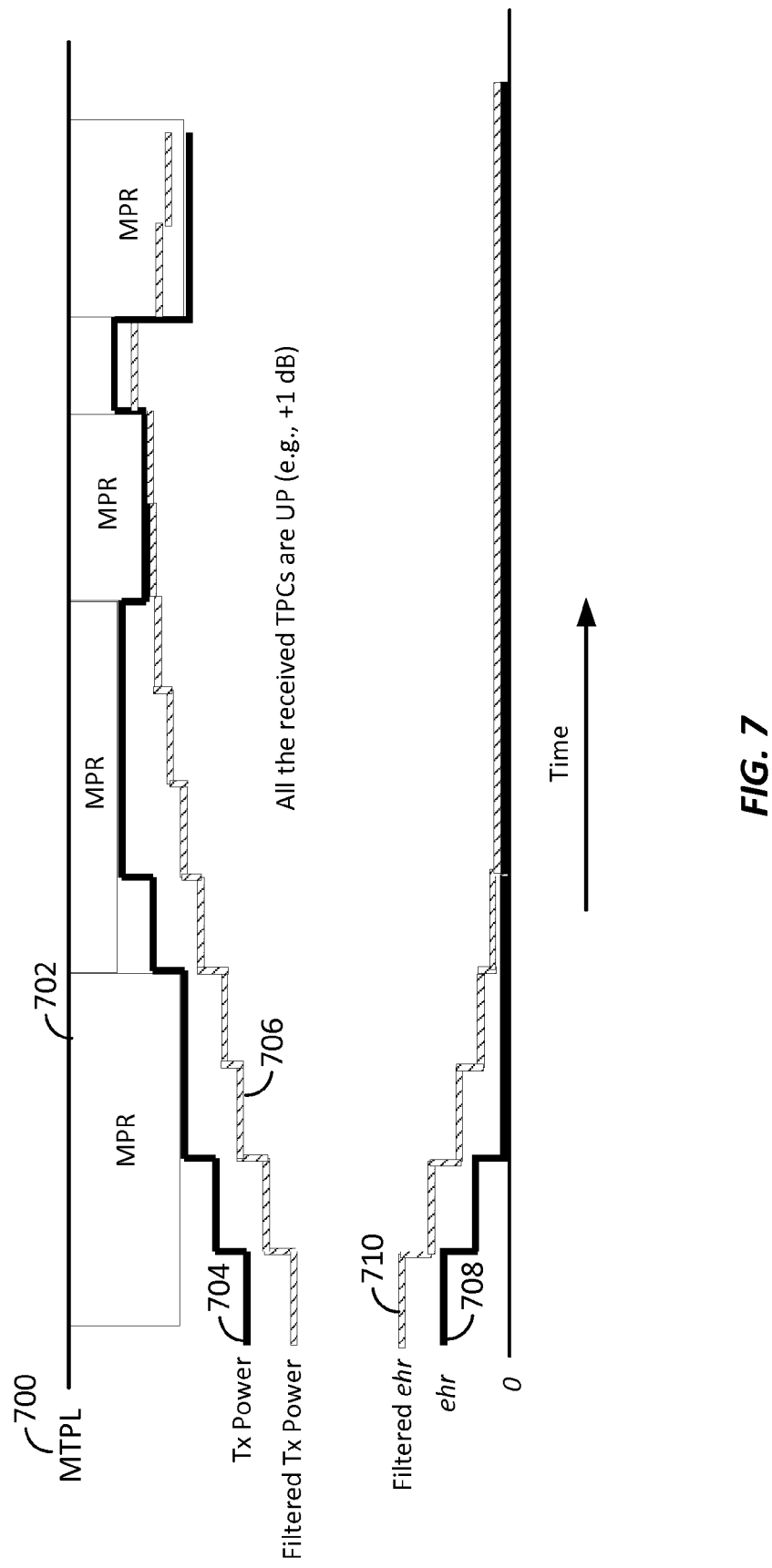
FIG. 7 is a simplified timing diagram illustrating the use of a headroom concept for triggering Event 6D reporting in accordance with aspects of the disclosure.

In accordance with some aspects of the present disclosure, the goals of Event 6D reporting may be achieved even in the HSPA environment. In addition, aspects of the present disclosure will be backward compatible to non-HSPA environments. FIG. 7 is a simplified timing diagram illustrating the use of a headroom concept for triggering an Event 6D report in accordance with aspects of the disclosure. Similar to FIG. 6, a UE is transmitting in the presence of the MPR 702. Here, the stepped solid line Tx power 704 illustrates the instantaneous uplink Tx power measured at the UE, and the stepped line (with a hatched pattern) filtered Tx power 706 represents the filtered value of the Tx power 704 as calculated when passed through a suitable filter.

In one aspect of the disclosure, an Event 6D report triggering scheme based on a headroom concept may be used in the presence of the MPR 702 for evaluating when the UE should trigger an Event 6D report. FIG. 7 conceptually illustrates a headroom ehr 708 that may be defined by Equation 1.

$$Ehr = Tx \text{ Power} - MTPL + MPR \qquad \text{Equation 1}$$

The headroom ehr 708 or a filtered headroom ehr 710 may be determined and compared with zero, rather than comparing the Tx Power 704 with the MTPL 700. The headroom or filtered headroom of the present disclosure may be referred as a transmit power margin. In FIG. 7, it is assumed that all TPC commands received by the UE instruct the UE to increase its uplink transmission power. For example, the TPC commands may instruct the UE to increase its Tx power by +1 dB. Therefore, as illustrated in FIG. 7, the headroom ehr 708 and filtered headroom ehr 710 both approach zero when the UE receives consecutive TPC UP commands. However, while the headroom ehr 708 and filtered headroom ehr 710 each approach zero, the Tx power 704 and filtered Tx power 706 do not reach the MTPL 710 because of the various MPRs 702 in use. In order words, comparing the headroom ehr 708 and/or filtered headroom ehr 710 with zero or a predetermined threshold value may be used as a way to determine whether the Tx power of the UE reaches a maximum allowable level when MPR is in use.

Figure 8:
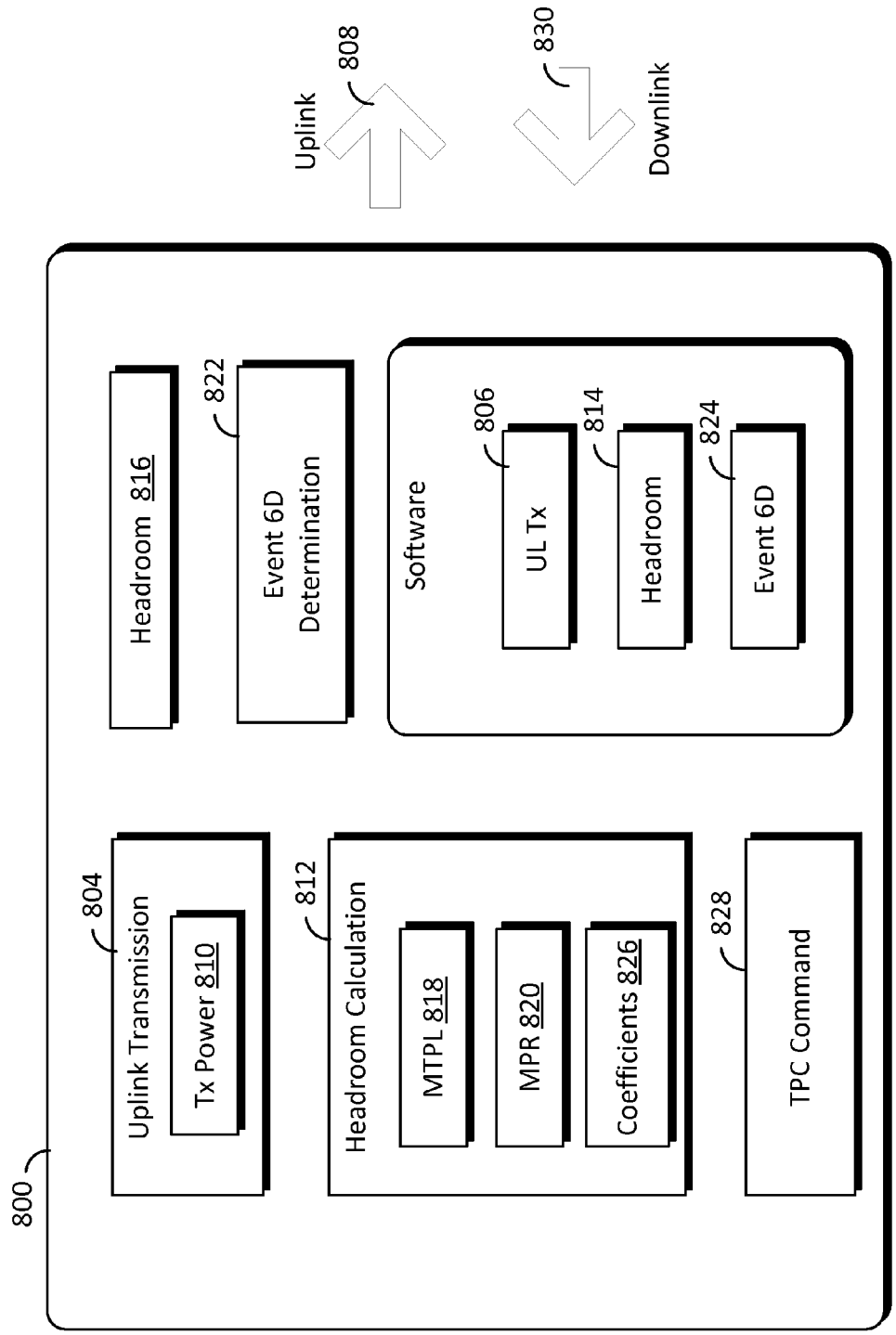
FIG. 8 is a conceptual block diagram of a UE capable of triggering an Event 6D report based on a headroom scheme in accordance with an aspect of the disclosure.

FIG. 8 is a conceptual block diagram of a UE 800 capable of triggering an Event 6D report based on a headroom based scheme in accordance with an aspect of the disclosure. For example, the UE 800 may be a UE as illustrated in any one or more of FIGS. 1, 2, 4, 5, and/or 9. The UE 800 includes various components that may be used to perform any of the functions, processes, steps and methods illustrated in any one or more of FIGS. 4, 6-7, and 10-13. For example, the UE 800 may be used to perform the procedures 1000 and 1300 of FIGS. 10 and 13. The illustrated components of the UE 800 may be implemented in software, hardware, firmware, or any combinations thereof.

The UE 800 may include an uplink (UL) transmission component 804 that may be configured by an uplink Tx code 806 to transmit a plurality of uplink transmissions 808 having a certain transmit power 810. For example, the uplink transmissions 808 may include R99 transmissions (e.g., DPCCH) and/or HSPA transmissions (e.g., HS-DP-CCH). The UE 800 may include a headroom calculation component 812 that may be configured by a headroom calculation software 814 to determine or calculate a headroom 816 as a function of the Tx power 810, an MTPL 818, and an MPR 820. For example, the function may be the same as Function 1 below.

Figure 10:
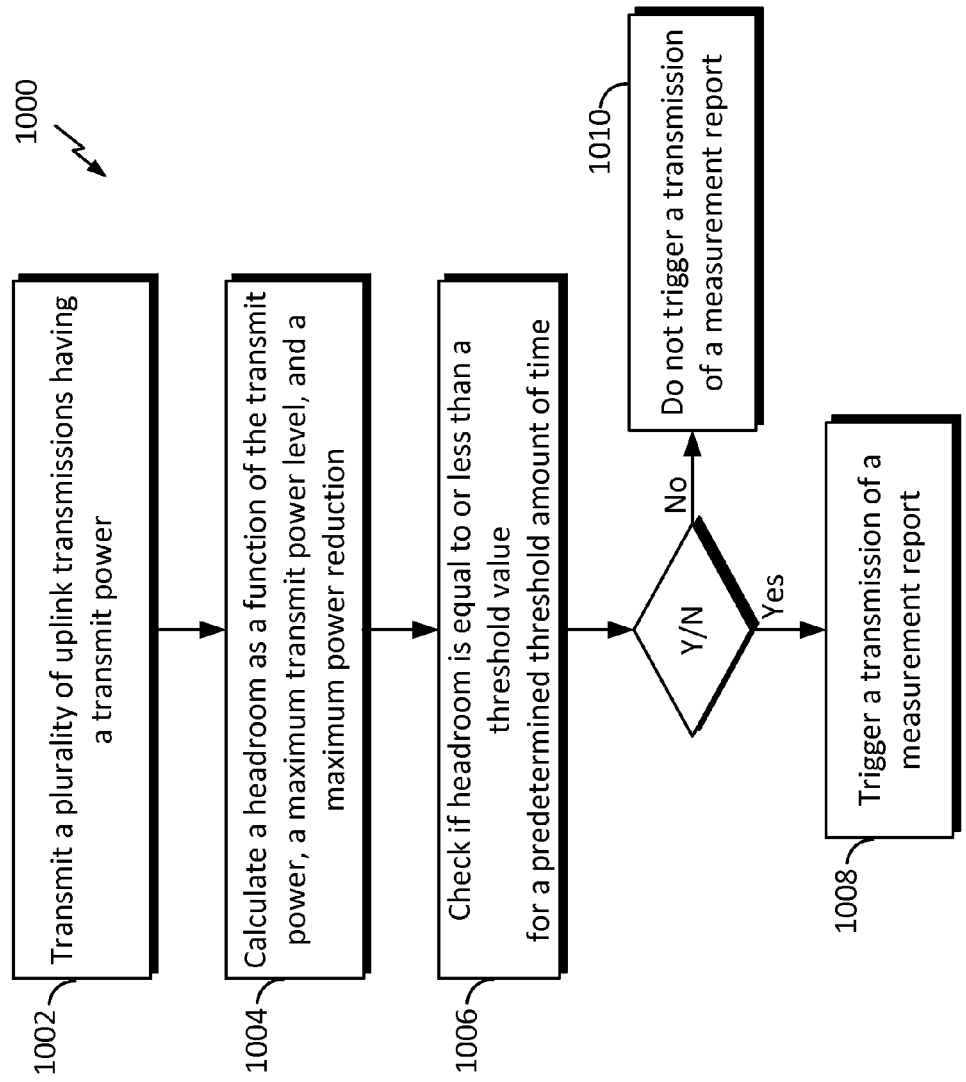
FIG. 10 is a flowchart illustrating a procedure of triggering a UE report indicating that the UE reaching its maximum transmit power in accordance with an aspect of the disclosure.
Figure 13:
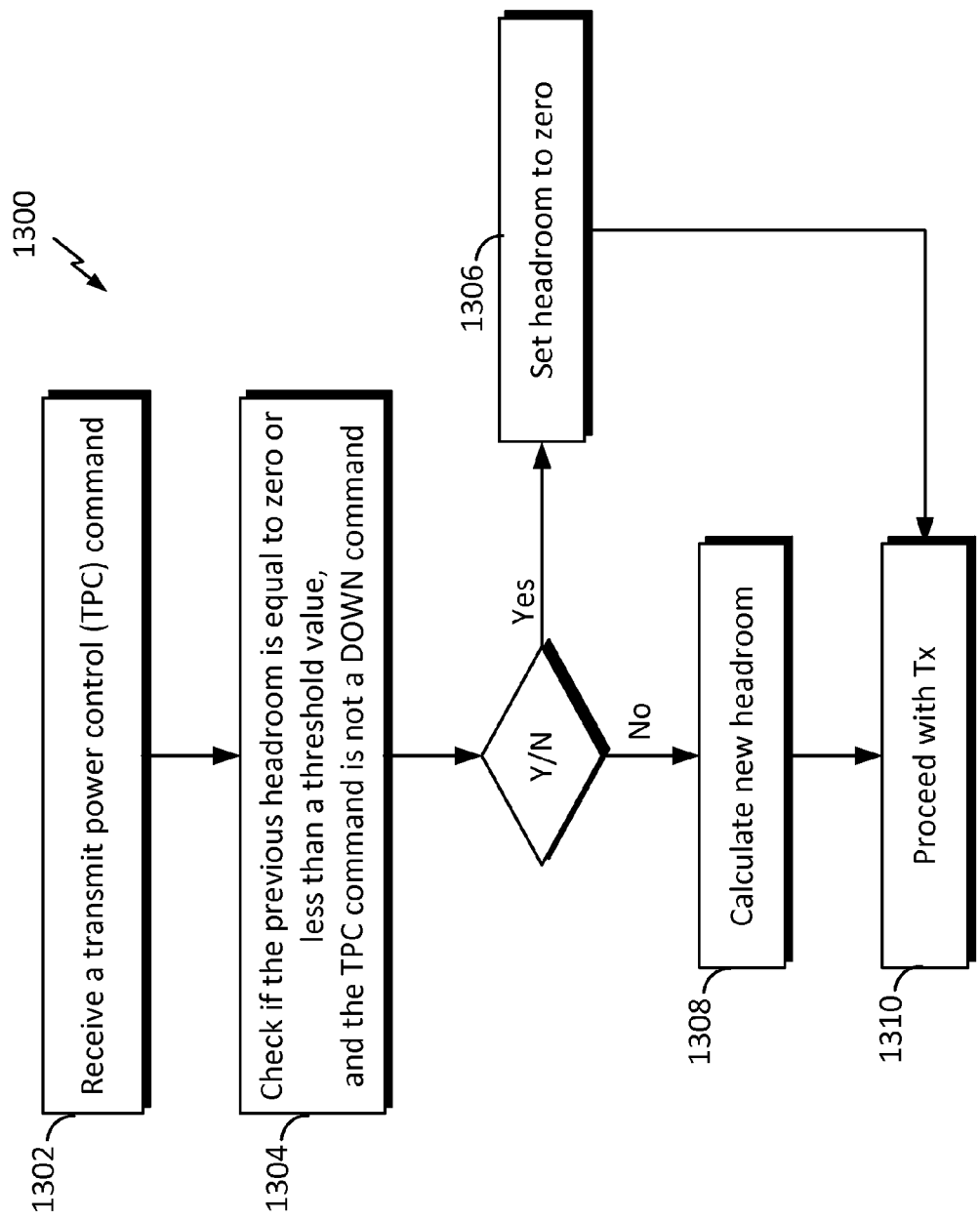
FIG. 13 is a flowchart illustrating an exemplary procedure for resetting a headroom value based on a condition equivalent to maximum Tx power in accordance with an aspect of the disclosure.

The UE 800 may include an Event 6D determination component 822 that may be configured by an Event 6D code 824 to trigger an Event 6D report transmission under certain conditions such as those described in procedure 1000 and 1300 of FIGS. 10 and 13. The procedures 1000 and 1300 will be described in detail below. For example, the Event 6D determination component 822 may trigger, in response to a determination that the headroom 816 is equal to or less than a threshold level for at least a predetermined threshold amount of time, a transmission of an Event 6D report (or a measurement report) indicating that the transmit power of the UE 800 has reached the MTPL 818. The predetermined threshold amount of time may be indicated by a time-to-trigger information element corresponding to the Event 6D.

The headroom calculation component 812 may be used to calculate the function of the transmit power, MTPL, and MPR, utilizing a signaled filter coefficient 826. For example, the function may be the same as Function 1 set forth below. In general, the network (e.g., Node B 108) sends signals to the UE 800 to indicate (1) whether filtering should be used or not, and (2) which filter coefficient (signaled filter coefficient) to be used. The UE 800 may include a TPC command component 828 that may be configured to receive one or more TPC commands from the downlink 830. If a previous value of the headroom 816 is equal to or less than the threshold value, and the received TPC command is not a DOWN command (e.g., 0 dB or +1 dB TPC command), the headroom calculation component 812 may set the headroom 816 equal to the threshold level. For example, the threshold level may be zero or any suitable value.

Figure 9:
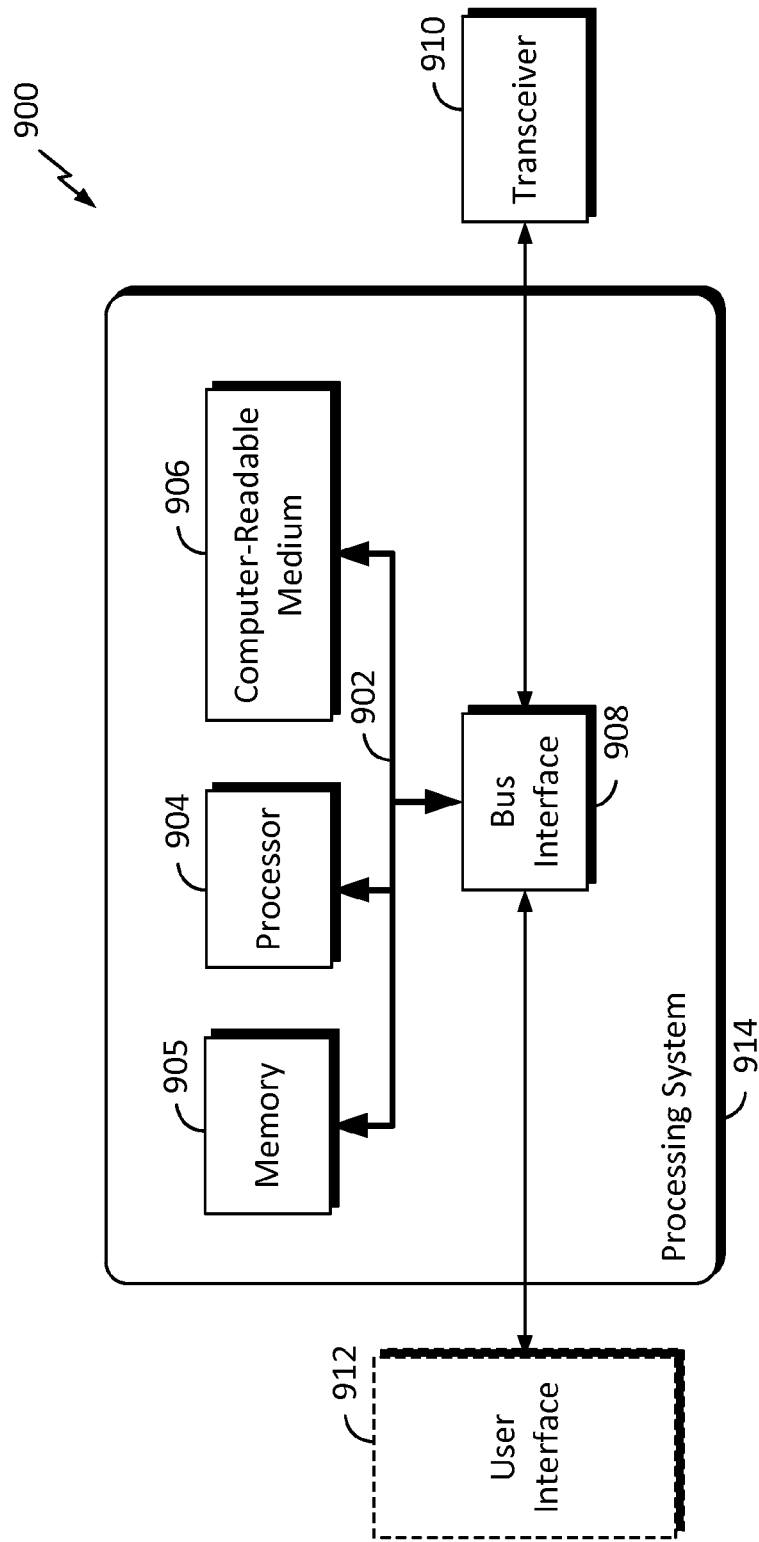
FIG. 9 is a block diagram illustrating an example of a hardware implementation for an apparatus employing a processing system.

FIG. 9 is a conceptual diagram illustrating an example of a hardware implementation for an apparatus 900 employing a processing system 914. In accordance with various aspects of the disclosure, an element, or any portion of an element, or any combination of elements may be implemented with a processing system 914 that includes one or more processors 904. For example, the apparatus 900 may be a UE as illustrated in any one or more of FIGS. 1, 2, 4, 5, and/or 8 such as the UE 800. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 904, as utilized in an apparatus 900, may be used to implement any one or more of the processes described and illustrated in FIGS. 4, 6, 7, and 10-13.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick, touchpad, touch screen) may also be provided.

The processor 904 is responsible for managing the bus 902 and general processing, including the execution of software stored on the computer-readable medium 906. The software, when executed by the processor 904, causes the processing system 914 to perform the various functions described in FIGS. 4, 6, 7, and 10-13 for any particular apparatus. The computer-readable medium 906 may also be used for storing data that is manipulated by the processor 904 when executing software.

One or more processors 904 in the processing system may execute software. For example, the software may include the software illustrated in FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 10 is a flowchart illustrating a procedure 1000 of using a headroom or a transmit power margin to trigger a UE report indicating that the UE reaches its maximum transmit power in accordance with an aspect of the disclosure. The procedure 1000 may be performed by any UE as illustrated in any one or more of FIGS. 1, 2, 4, 5, 8 and/or 9. The following procedure described and illustrated in FIG. 10 may apply to a UE that either is not configured for HSPA, or is operating in a non-HSPA (e.g., according to 3GPP Release 99 or R99 standards) W-CDMA network. In some aspects of the disclosure, the UE may be instructed to use headroom (e.g., headroom ehr 708) or a suitably filtered headroom (e.g., filtered headroom ehr 710) for determining whether or not to trigger an Event 6D report.

In general, an Event 6D report procedure that may be deployed in an R99 network is as follows:

1) Filter the Tx power 704 (e.g., filtered Tx power 706) with certain coefficients;
2) Compare the filtered Tx power 706 with the MTPL 700; and
3) Trigger the Event 6D report if the filtered Tx power 706 and MTPL 700 are the same (or substantially the same) for greater than a threshold amount of time.

In one example, a metric for comparing the filtered Tx power 706 with the MTPL 700 may be the Equation 2 (metric) below. The filtered Tx power 706 reaches the MTPL 700 when the Equation 2 is evaluated to be zero or positive.

$$f(TP_k)-MTPL=\alpha\Sigma_{i=0}^{k}(1-\alpha)^{i}TP_{k-i}-MTPL \qquad \text{Equation 2}$$

Where f( ) is a filtering operation for calculating the filtered Tx power, a is a suitable filter coefficient, and $TP_k$ is the Tx power at time k. However, as shown in FIGS. 6 and 7, the filtered Tx power rarely reaches the MTPL, if at all, because of the MPRs.

Referring to FIG. 10, the procedure 1000 may implement the following function to determine when an Event 6D report should be triggered.

$$f(TP_k-MTPL+MPR) \qquad \text{Function 1}$$

Function 1 determines a filtered headroom $f(TP_k-MTPL+MPR)$, for example, the filtered headroom ehr 710 of FIG. 7. It can be shown that Function 1 converges to Equation 2 above as k becomes sufficiently large. Therefore, these two metrics (filtered Tx power of Equation 2 and filtered headroom ehr of Function 1) can be considered to represent the same characteristic of the UE's Tx power as k becomes sufficiently large, which is typical in actual UE operation. Therefore, in one aspect of the disclosure, Function 1 may be used to determine whether or not the UE's Tx power reaches the MTPL. Referring to FIG. 10, at block 1002, a UE transmits a plurality of uplink transmissions having a transmit power. In one aspect of the disclosure, the UE may utilize the UL transmission component 804 of FIG. 8 to transmit the uplink transmissions. For example, the uplink transmissions may include user data and/or signaling data such as the uplink transmissions 407 of FIG. 4. At block 1004, the UE calculates a headroom (a transmit power margin) as a function of the transmit power of the uplink transmissions, a maximum transmit power level (MTPL), and a maximum power reduction (MPR). In one aspect of the disclosure, the UE may utilize the headroom calculation component 812 of FIG. 8 to calculate this function. In one example, the transmit power may be the Tx power 704, the maximum transmit power level may be the MTPL 700, and the maximum power reduction may be the MPR 702.

In one aspect of the disclosure, the headroom may be a filtered headroom that is calculated in accordance with Function 1, which may be signaled from the network. At block 1006, if it is determined that the headroom (e.g., headroom 816 of FIG. 8) is equal to or less than a threshold value for at least a predetermined threshold amount of time, the procedure 1000 continues to block 1008; otherwise, the procedure 1000 continues to block 1010. For example, the threshold value may be zero or any suitable value. At block 1008, the UE triggers a transmission of a measurement report. In one aspect of the disclosure, the UE may utilize the Event 6D determination component 822 of FIG. 8 to trigger the transmission of the report. For example, the measurement report may indicate that the transmit power of the UE has reached the MTPL such as an Event 6D report. The predetermined threshold amount of time may correspond to a time-to-trigger value provided by the network or any suitable value. At block 1010, the UE does not trigger the transmission of the measurement report. In one aspect of the disclosure, using procedure 1000, a UE can trigger the transmission of an Event 6D report even when its Tx power and/or filtered Tx power does not or rarely reach the MTPL (e.g., MTPL 600 or 700). In other words, the procedure 1000 allows the UE to trigger the Event 6D report in a condition considered to be equivalent to the UE's Tx power reaching the MTPL.

While the MTPL may have a constant value in the above examples, in accordance with other aspects of the disclosure, the value of the MTPL may vary over time according to various implementation-specific considerations. For example, the MTPL may be adjusted as a function of one or more factors or parameters such as temperature, frequency, etc.

Headroom Based Event 6D Triggering

Figure 11:
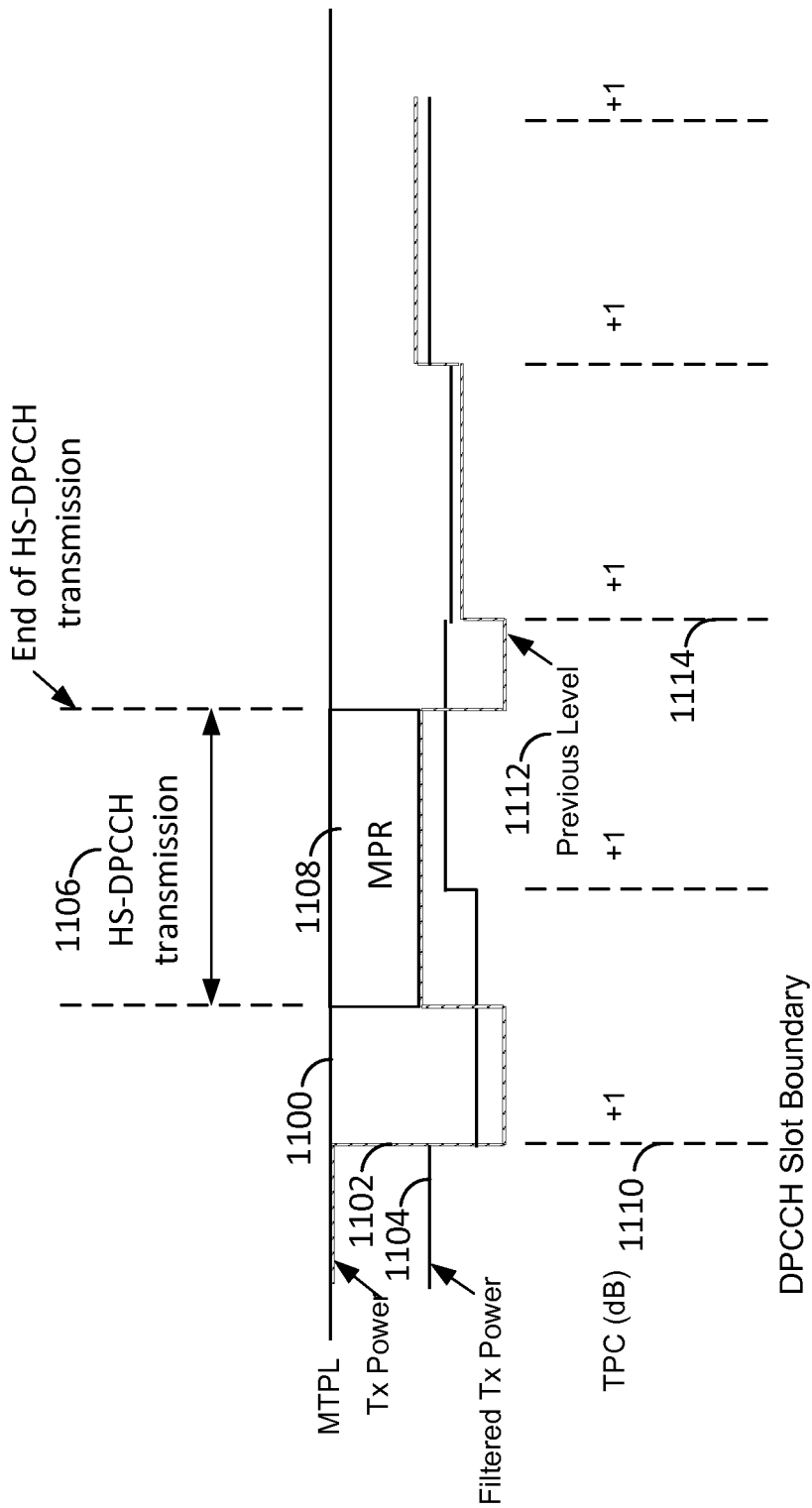
FIG. 11 is a timing diagram illustrating a failure to trigger an Event 6D report in a UE configured for a HSPA network.

Although the procedure 1000 discussed above allows a UE to trigger an Event 6D report transmission based on the filtered headroom (e.g., according to Function 1), there are still some situations that a UE may fail to trigger the Event 6D report based on the filtered headroom procedure. FIG. 11 is a timing diagram illustrating an example in which a UE configured for HSPA may fail to trigger an Event 6D report even if the filtered headroom procedure 1000 of FIG. 10 is used. Similar to the MTPL shown in FIGS. 6 and 7, the MTPL 1100 may have a fixed value, and the Tx power 1102 (stepped line with a hatched pattern) of the UE is illustrated over time. In one example, the MTPL 1100 has a fixed value of 23 dBm (Decibel-milliwatts). In other examples, the MPTL 1100 may have other fixed or variable values. Further, a filtered Tx power 1104 (stepped solid line) is illustrated in FIG. 11, corresponding to the value of Tx power 1102 filtered utilizing a suitable filter. In the illustration, slot boundaries are denoted with dashed vertical lines.

According to the current HSPA standards, the Tx power 1102 is capped at each DPCCH slot boundary based on the observation of an upcoming HS-DPCCH transmission 1106 during that slot, so that the Tx power 1102, including the power of the HS-DPCCH transmission 1106, does not exceed the MTPL 1100. For example, during the HS-DPCCH transmission 1106, an MRP 1108 is used to cap the Tx power 1102. In this case, the Tx power 1102 may reach the MTPL 1100 before the slot boundary 1110 for the upcoming HS-DPCCH transmission 1106. Then, the Tx power 1102 is reduced before the actual HS-DPCCH transmission 1106 and capped by the MPR 1108 during the HS-DPCCH transmission 1106.

Further, after the HS-DPCCH transmission 1106, the Tx power 1102 should not be increased to the MTPL 1100 immediately according to current 3GPP standards. Instead, the Tx power 1102 may return to its previous level 1112 before the HS-DPCCH transmission and then follow the uplink TPC commands decoded after that. Therefore, it will take a certain period of time for the Tx power 1102 to reach the MTPL 1100 after receiving a number of UP TPC commands (e.g., +1 dB TPC commands). In this example, the Tx power 1102 (or the filtered Tx power 1104) cannot be maintained at the MTPL 1100 continuously for a period of time longer than a typical time-to-trigger interval such as 200 milliseconds. In other words, the Event 6D report will rarely be triggered if there are intermittent HS-DPCCH transmissions.

The example illustrated in FIG. 11 illustrates the behavior of a UE when it is initially transmitting at the MTPL 1100, and then has to transmit the HS-DPCCH transmission 1106 on top of, for example, an R99 uplink transmission (e.g., DPCCH transmission). That is, as seen at the first slot boundary 1110, even though the UE receives an UP TPC command (e.g., +1 dB) requesting the UE to increase its Tx power 1102, the UE instead reduces its Tx power on the slot boundary 1110 right before the HS-DPCCH transmission 1106 (which is typically not aligned with a DPCCH slot). During the HS-DPCCH transmission 1106, the UE's Tx power 1102 is capped by the use of MPR 1108. At the end of the HS-DPCCH transmission 1106, the Tx power 1102 may be back to the previous level 1112 just before the HS-DPCCH transmission, not increased directly to the MTPL 1100 (or the Tx power 1102 may stay at the same level). At the next slot boundary 1114, the UE can follow the next UP TPC command (e.g., +1 dB TPC command), further increasing its Tx power. It will take a few slots (i.e., a few UP TPC commands) until the UE reaches the MTPL 1100. That is, according to the current 3GPP standards, the amount that the uplink Tx power 1102 may be increased from slot to slot in response to an UP TPC command (e.g., +1 dB TPC command) is limited, and in general may not be sufficient to raise the Tx power 1102 back up to the MTPL 1100 before, for example, another HS-DPCCH transmission, undesirably resulting in a headroom (e.g., filtered headroom ehr 710 of FIG. 7) value greater than zero most if not all of the time.

Figure 12:
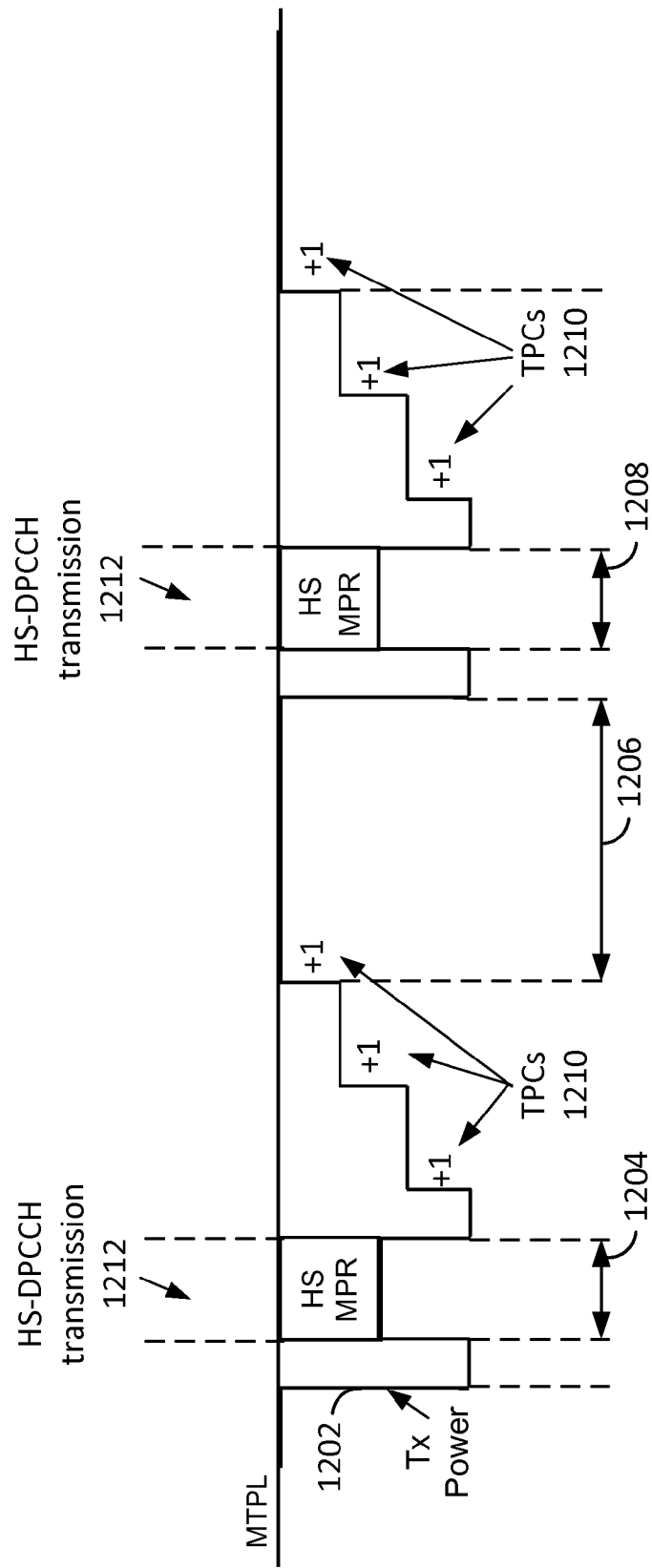
FIG. 12 is a timing diagram illustrating certain Tx power conditions that can be treated by a UE as equivalent to reaching a maximum Tx power in accordance with an aspect of the disclosure.

FIG. 12 is a timing diagram illustrating certain Tx power conditions that can be treated by a UE as equivalent to its Tx power reaching the MTPL in accordance with an aspect of the disclosure. For example, the UE may be any UE as illustrated in any one or more of FIGS. 1, 2, 4, 5, 8, and/or 9. In this example, the UE may utilize the procedure 1000 to determine when the UE reaches the MTPL based on a filtered headroom (e.g., filtered headroom ehr 710) and received TPC commends. In FIG. 12, for example, the UE's Tx power 1202 reaches different allowable maximum Tx power levels in certain short time intervals 1204, 1206, and 1208 where the UE's headroom becomes zero (or less than a certain predetermined value). In these intervals, the UE has no more headroom to increase the Tx power 1202, for example, its DPCCH Tx Power.

In this example, in the intervals 1204 and 1208, the Tx power 1202 is capped by the MPR, and in the interval 1206, the Tx power 1202 actually can reach the MTPL. FIG. 12 may be viewed as the same scenario illustrated in FIG. 11, extended in time. As seen in FIG. 12, as long as the UE has intermittent HS-DPCCH transmissions 1212, the UE's Tx power 1202 may never or rarely be maintained at the MTPL for a sufficiently long period of time to trigger an Event 6D reporting. Even using the headroom procedure 1000 of FIG. 10, the UE may not be able to trigger an Event 6D report because the calculated headroom during the intervals, for example, between the intervals 1204, 1206, and 1208, are will be not zero. That is, the headroom would not be maintained at zero or below a suitable threshold value for a sufficiently long period of time to trigger the Event 6D report. The headroom based Event 6D triggering procedure 1000 can be further improved to handle this problem in accordance with an aspect of the disclosure as described below.

HSPA with Intermittent HS Transmissions—Resetting Headroom for Triggering Event 6D Based on a Condition Equivalent to Maximum Tx Power FIG. 13 is a flowchart illustrating an exemplary procedure 1300 for resetting a headroom value based on a condition equivalent to maximum Tx power in accordance with an aspect of the present disclosure. For example, the procedure 1300 may be performed by any UE as illustrated in any one or more of FIGS. 1, 2, 4, 5, 8, and/or 9. When a UE implements the procedures 1000 and 1300, the UE can detect conditions that are equivalent to the Tx power reaching the MTPL, without necessarily having the Tx power be maintained at the MTPL for a threshold amount of time, resulting in the triggering of an Event 6D. However, the UE may implement any of the procedures 1000 and 1300 individually or in combination. The procedure 1300 allows the UE to set headroom value to zero or any suitable value to handle situations in which the headroom cannot be maintained at zero or below a threshold value due to intermittent HSPA transmissions such as the HS-DPCCH transmissions illustrated in FIGS. 11 and 12.

In one example, the UE may calculate a headroom similar to the headroom ehr 708 or filtered headroom ehr 710 of FIG. 7. In the illustrated procedure 1300, for example, the value of the headroom ehr may be controlled, with its value being set in accordance with one or more received TPC commands, as well as depending on a prior state or value of the headroom. That is, by controlling the value of the headroom ehr, the triggering of an Event 6D report can be achieve at the UE, even in the face of the Tx power rarely or never actually reaching the MTPL, for example, due to intermittent HS-DPCCH transmissions, for example, as illustrated in FIGS. 11 and 12.

Recall that the value of the headroom ehr may be defined as ehr=Tx Power−MTPL+MPR (see Equation 1). However, as described above with FIGS. 11 and 12, due to the presence of intermittent HSPA transmissions (e.g., HS-DPCCH transmissions), the value of the headroom ehr (or filtered headroom) may rarely or never be zero or less than a threshold value, and the triggering of the Event 6D report depends on the headroom ehr value being equal to zero or less than a threshold value for greater than a threshold amount of time. Thus, in an aspect of the present disclosure, as described below, the UE may modify its headroom value (transmit power margin) in certain circumstances to allow the headroom ehr to be set to zero or any suitable value such that the Event 6D report transmission can be suitably triggered. For example, the transmit power margin can be defined as Tx Power−MTPL+MPR.

Referring to FIG. 13, at block 1302, the UE receives a TPC command. For example, the UE may receive one or more first TPC command 1210 after the interval 1204 of FIG. 12. In one aspect of the disclosure, the UE may utilize the TPC command component 828 of FIG. 8 to receive one or more TPC commands from the downlink. At block 1304, the UE checks if the previous headroom is equal to zero or less than a predetermined threshold value (i.e., indicating no headroom, equivalent to the UE transmitting at MTPL), and the received TPC command is not a DOWN TPC command, then the procedure 1300 proceeds to block 1306; otherwise, the procedure 1300 proceeds to block 1308. In one aspect of the disclosure, the UE may utilize the headroom calculation component 812 and/or the TPC command component 828 of FIG. 8 to perform the processes of block 1304. In one example, a DOWN TPC command may be a request to reduce the Tx power by 1 dB. Examples of TPC commands that are not a DOWN TPC command includes commands that request the UE to maintain the Tx power (e.g. 0 dB TPC command) and increase the Tx power (e.g., +1 dB TPC command).

At block 1306, the UE may set the headroom to a value of 0 or less than the predetermined threshold value. Otherwise, at block 1308 (i.e., the previous headroom value does not equal to zero or less than a threshold value, and/or the received TPC command is a DOWN command), then a new headroom value may be calculated as a function of the Tx power, MTPL and MPR (e.g., ehr=Tx Power−MTPL+

MPR). In one aspect of the disclosure, the UE may utilize the headroom calculation component 812 of FIG. 8 to perform the processes of block 1306.

At block 1310, the UE may proceed with the next uplink transmission at the Tx power controlled in accordance with the received TPC command. In one example, the headroom will be zero in the time interval 1204 of FIG. 12. After the interval 1204, the UE receives three consecutive UP TPC commands (e.g., +1 dB TPC command). Therefore, the headroom value will be set to zero repeatedly after receiving each UP TPC command 1210 in accordance with the procedure 1300. In this case, the Tx power of the UE may be considered as equivalent to reaching the MTPL during the time period spanning from the interval 1204 through the interval 1206, and an Event 6D report may be triggered if this time period is longer than the time-to-trigger value. In this way, as described above, the Event 6D report may be triggered by the UE in the circumstance that the UE's Tx power is at the maximum that it could actually be, even though this Tx power is less than the MTPL, due to the limitation on how much the Tx power can be increased in each slot in response to a received TPC UP command after the HS-DPCCH transmissions.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE) in a wireless communication network, comprising:

transmitting a plurality of uplink transmissions having a transmit power;

calculating a transmit power margin as a function of the transmit power, a maximum transmit power level (MTPL), and a maximum power reduction (MPR); and triggering, in response to a determination that the transmit power margin is equal to or less than a threshold level for at least a predetermined threshold amount of time, a transmission of a measurement report indicating that the transmit power of the UE has reached the MTPL, wherein the function comprises:

$$f(TP_k - MTPL + MPR_k)$$

wherein:
$TP_k$ is the transmit power of the UE at time k;
MTPL is the maximum transmit power level;

MPR$_k$ is the maximum power reduction value; and
f()is the filtering signaled by network.

2. The method of claim 1, wherein the calculating the transmit power margin comprises:
calculating the function of the transmit power, the MTPL, and the MPR, utilizing a signaled filter coefficient.

3. The method of claim 1, wherein the measurement report comprises an Event 6D report for a UMTS network.

4. The method of claim 3, wherein the predetermined threshold amount of time is indicated by a time-to-trigger information element corresponding to the Event 6D report.

5. The method of claim 1, wherein the uplink transmissions comprise a high-speed dedicated physical control channel (HS-DPCCH) transmission.

6. The method of claim 1, further comprising:
receiving a transmit power control (TPC) command; and
if a previous value of the transmit power margin is equal to or less than the threshold level, and the received TPC command is not a DOWN command, setting the transmit power margin equal to the threshold level.

7. A user equipment (UE), comprising:
means for transmitting a plurality of uplink transmissions having a transmit power;
means for calculating a transmit power margin as a function of the transmit power, a maximum transmit power level (MTPL), and a maximum power reduction (MPR); and
means for triggering, in response to a determination that the transmit power margin is equal to or less than a threshold level for at least a predetermined threshold amount of time, a transmission of a measurement report indicating that the transmit power of the UE has reached the MTPL,
wherein the function comprises:

$$f(TP_k - MTPL + MPR_k)$$

wherein:
TP$_k$ is the transmit power of the UE at time k;
MTPL is the maximum transmit power level;
MPR$_k$ is the maximum power reduction value; and
f()is the filtering signaled by network.

8. The UE of claim 7, wherein the means for the calculating the transmit power margin is configured to calculate the function of the transmit power, the MTPL, and the MPR, utilizing a selected filter coefficient.

9. The UE of claim 7, wherein the measurement report comprises an Event 6D report for a UMTS network.

10. The UE of claim 9, wherein the predetermined threshold amount of time is indicated by a time-to-trigger information element corresponding to the Event 6D report.

11. The UE of claim 7, wherein the uplink transmissions comprise a high-speed dedicated physical control channel (HS-DPCCH) transmission.

12. The UE of claim 7, further comprising:
means for receiving a transmit power control (TPC) command; and
means for if a previous value of the transmit power margin is equal to or less than the threshold level, and the received TPC command is not a DOWN command, setting the transmit power margin equal to the threshold level.

13. A non-transitory computer-readable medium comprising code for causing a user equipment (UE) to:
transmit a plurality of uplink transmissions having a transmit power;
calculate a transmit power margin as a function of the transmit power, a maximum transmit power level (MTPL), and a maximum power reduction (MPR); and
trigger, in response to a determination that the transmit power margin is equal to or less than a threshold level for at least a predetermined threshold amount of time, a transmission of a measurement report indicating that the transmit power of the UE has reached the MTPL,
wherein the function comprises:

$$f(TP_k - MTPL + MPR_k)$$

wherein:
TP$_k$ is the transmit power of the UE at time k;
MTPL is the maximum transmit power level;
MPR$_k$ is the maximum power reduction value; and
f()is the filtering signaled by network.

14. The non-transitory computer-readable medium of claim 13, wherein the code further causes the UE to:
calculate the function of the transmit power, the MTPL, and the MPR, utilizing a selected filter coefficient.

15. The non-transitory computer-readable medium of claim 13, wherein the measurement report comprises an Event 6D report for a UMTS network.

16. The non-transitory computer-readable medium of claim 15, wherein the predetermined threshold amount of time is indicated by a time-to-trigger information element corresponding to the Event 6D report.

17. The non-transitory computer-readable medium of claim 13, wherein the uplink transmissions comprise a high-speed dedicated physical control channel (HS-DPCCH) transmission.

18. The non-transitory computer-readable medium of claim 13, wherein the code further causes the UE to:
receive a transmit power control (TPC) command; and
if a previous value of the transmit power margin is equal to or less than the threshold level, and the received TPC command is not a DOWN command, set the transmit power margin equal to the threshold level.

19. A user equipment (UE), comprising:
at least one processor;
a memory; and
a user interface operatively coupled to the at least one processor,
wherein the at least one processor comprises:
a first component configured to transmit a plurality of uplink transmissions having a transmit power;
a second component configured to calculate a transmit power margin as a function of the transmit power, a maximum transmit power level (MTPL), and a maximum power reduction (MPR); and
a third component configured to trigger, in response to a determination that the transmit power margin is equal to or less than a threshold level for at least a predetermined threshold amount of time, a transmission of a measurement report indicating that the transmit power of the UE has reached the MTPL,
wherein the function comprises:

$$f(TP_k - MTPL + MPR_k)$$

wherein:
TP$_k$ is the transmit power of the UE at time k;
MTPL is the maximum transmit power level;
MPR$_k$ is the maximum power reduction value; and
f()is the filtering signaled by network.

20. The UE of claim 19, wherein the second component is further configured to calculate the function of the transmit power, the MTPL, and the MPR, utilizing a selected filter coefficient.

21. The UE of claim 19, wherein the measurement report comprises an Event 6D report for a UMTS network.

22. The UE of claim 21, wherein the predetermined threshold amount of time is indicated by a time-to-trigger information element corresponding to the Event 6D report.

23. The UE of claim 19, wherein the uplink transmissions comprise a high-speed dedicated physical control channel (HS-DPCCH) transmission.

24. The UE of claim 19, wherein:
- the at least one processor further comprises a fourth component configured to receive a transmit power control (TPC) command; and
- if a previous value of the transmit power margin is equal to or less than the threshold level, and the received TPC command is not a DOWN command, the second component is further configured to set the transmit power margin equal to the threshold level.

\* \* \* \* \*